(12) United States Patent
Barrow et al.

(10) Patent No.: US 8,059,613 B1
(45) Date of Patent: Nov. 15, 2011

(54) IMPLEMENTING REDIRECT ON INTEROPERABILITY GATEWAY FOR CDMA TERMINATED PTT CALLS

(75) Inventors: Steven Barrow, South Riding, VA (US); Safwan Khan, Gainsville, VA (US); Trinh Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 920 days.

(21) Appl. No.: 11/494,987

(22) Filed: Jul. 28, 2006

(51) Int. Cl.
*H04B 7/216* (2006.01)

(52) U.S. Cl. ........................................ 370/335; 455/436

(58) Field of Classification Search .......... 455/517–222, 455/445
See application file for complete search history.

(56) References Cited

U.S. PATENT DOCUMENTS

| | | | |
|---|---|---|---|
| 6,094,578 A | 7/2000 | Purcell et al. | |
| 6,157,837 A | 12/2000 | Kato et al. | |
| 6,292,671 B1 * | 9/2001 | Mansour | 455/518 |
| 6,360,093 B1 | 3/2002 | Ross et al. | |
| 6,363,431 B1 | 3/2002 | Hammer et al. | |
| 6,424,638 B1 | 7/2002 | Ray et al. | |
| 6,477,150 B1 | 11/2002 | Maggenti et al. | |
| 6,560,457 B1 | 5/2003 | Silver et al. | |
| 6,725,053 B2 | 4/2004 | Rosen et al. | |
| 6,763,226 B1 | 7/2004 | McZeal, Jr. | |
| 7,379,735 B2 * | 5/2008 | Villa et al. | 455/426.1 |
| 2004/0048615 A1 * | 3/2004 | Kato et al. | 455/435.1 |
| 2006/0052126 A1 * | 3/2006 | Choksi | 455/518 |
| 2006/0052130 A1 * | 3/2006 | Choksi | 455/552.1 |
| 2006/0058007 A1 * | 3/2006 | Choksi | 455/406 |
| 2006/0072517 A1 * | 4/2006 | Barrow et al. | 370/335 |
| 2006/0258370 A1 * | 11/2006 | Sudit et al. | 455/456.1 |

* cited by examiner

*Primary Examiner* — Rafael Pérez-Gutiérrez
*Assistant Examiner* — Marcos Batista

(57) ABSTRACT

A communications system includes a first PTT network, and a second PTT network having a plurality of interoperability gateways. A method for routing a PTT call terminated at the second PTT network includes receiving a PTT call request from the first PTT network, the PTT call request identifying a target subscriber unit on the second PTT network and forwarding the PTT call request to a first interoperability gateway. If the target is located in a region served by a second PTT interoperability gateway, then a redirect message, including an identifier of the second PTT interoperability gateway, is received and the PTT call request is redirected to the second PTT interoperability gateway. An identifier of the target and an identifier of the second PTT interoperability gateway are stored in a cache for directing subsequent PTT calls to the same target to the corresponding second interoperability gateway. In one embodiment, the first PTT network is an iDEN network and the second PTT network is a HPPTT network and the PTT call is a HPPTT call.

17 Claims, 4 Drawing Sheets

IMPLEMENTING REDIRECT ON INTEROPERABILITY GATEWAY FOR CDMA TERMINATED PTT CALLS

FIELD OF THE INVENTION

The present invention relates generally to wireless communications systems and more particularly to systems and methods for facilitating Push-to-Talk (PTT) calls between a code division multiple access (CDMA) network and a second PTT network.

BACKGROUND OF THE INVENTION

PTT services, also known as walkie-talkie or dispatch services, provide near-instant, half-duplex communication between a PTT caller and one or more target PTT users. PTT services are typically offered as subscription services on wireless communications systems, which may also offer interconnect, short message service (SMS), packet data and other communications services to its subscribers. Each wireless communications system facilitates communications using one or more wireless technologies such as CDMA, global system for mobile communication (GSM) or time division multiple access (TDMA). Known PTT technologies include Nextel's Direct Connect®, Qualcomm's QChat and Push-to-Talk over Cellular (PoC).

A PTT call spanning more than one PTT network or technology may be connected through one or more gateways that translate between signaling and media protocols of the networks. For example, a High Performance PTT (HPPTT) CDMA network (e.g., QChat) includes a plurality of interoperability gateways adapted to receive PTT call requests from an external PTT network, such as an Integrated Digital Enhanced Network (iDEN network). A PTT call from a subscriber on an iDEN network to a target subscriber on a HPPTT network may be forwarded to any HPPTT Gateway on the HPPTT network. The HPPTT Gateway forwards the incoming call to a regional HPPTT Server which manages the PTT call within the HPPTT network.

The target HPPTT subscriber, however, may be located in a remote region, resulting in inefficient PTT call handling between the HPPTT network and the external PTT network. For example, a PTT call intended for a HPPTT subscriber roaming in New York may be routed to a HPPTT Gateway in California, which will be responsible for establishing the PTT call with the target HPPTT subscriber roaming in New York, resulting in a cross country PTT call. Thus, there is a need for an efficient system and method for handling PTT calls from an external system where the PTT targets are located in a HPPTT network.

SUMMARY OF THE INVENTION

The present invention is a system and method for implementing redirects on interoperability gateways for HPPTT terminated PTT calls. In one aspect of the present invention a communications system includes a first PTT network, such as an iDEN network, and a second PTT network, such as a HPPTT network, having a plurality of interoperability gateways. A method for selecting an interoperability gateway for PTT calls terminated at the second PTT network includes receiving a PTT call request from the first PTT network. The PTT call request identifies a target subscriber unit on the second PTT network and is forwarded to a first interoperability gateway. A redirect message is subsequently received from the first interoperability gateway. The redirect message includes an identification of the target subscriber and a second interoperability gateway. The PTT call is redirected to the second interoperability gateway. An identifier of the target subscriber and an identifier of the second interoperability gateway are stored in a cache for subsequent use in routing calls to the target subscriber unit.

In another aspect of the present invention, a PTT communications system including a first PTT network, a second PTT network having a plurality of interoperability gateways, and a PTT interoperability infrastructure. The PTT interoperability infrastructure includes a PTT controller adapted to select one of the plurality of interoperability gateways in response to a PTT call request from the first PTT network to a PTT target on the second PTT network, and forward the PTT call request to the selected PTT interoperability gateway. The PTT controller is further adapted to receive a redirect message, including an identifier of a second PTT interoperability gateway, and redirect the PTT call request to the second PTT interoperability gateway.

In another aspect of the present invention, a PTT communications system includes a first PTT network, a second PTT network having a plurality of interoperability gateways and a system interconnecting the two PTT networks. The system includes an interface to the first PTT network, an interface to the second PTT network and a controller. The controller is adapted to receive a PTT call request from the first PTT network. The PTT call request identifies a target subscriber unit on the HPPTT network, and forwards the PTT call request to a first HPPTT interoperability gateway. The controller is further adapted to receive a redirect message from the first HPPTT interoperability gateway, the redirect message including an identifier of the target subscriber unit and a second HPPTT interoperability gateway, and redirect the PTT call request to the second HPPTT interoperability gateway. The system further includes a data storage adapted to store an identifier of the target subscriber and an identifier of the second interoperability gateway.

A more complete understanding of the present invention will be afforded to those skilled in the art, as well as a realization of additional advantages and objects thereof, by a consideration of the following detailed description.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
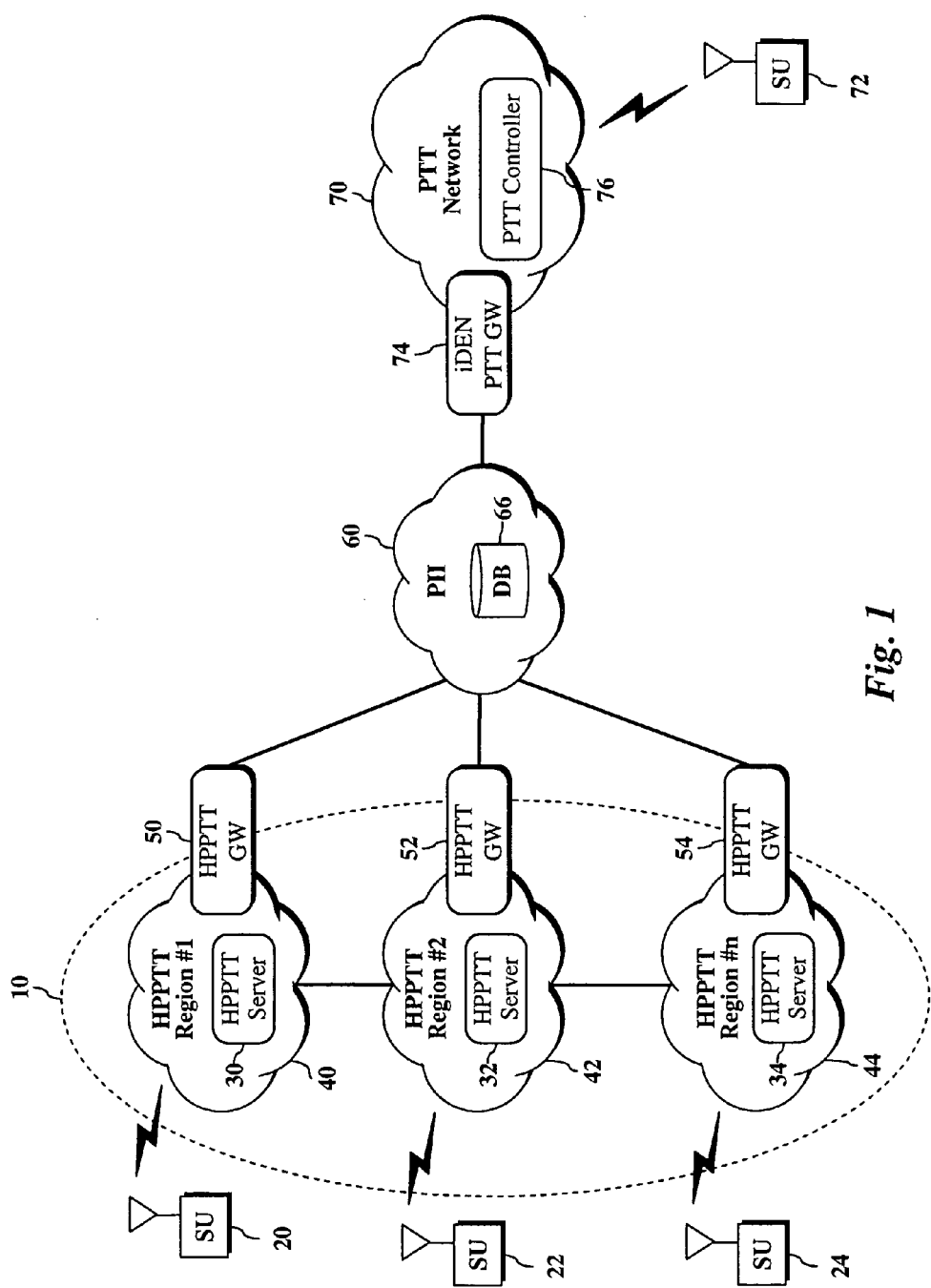
FIG. 1 is an exemplary PTT network architecture in accordance with an embodiment of the present invention.

An embodiment of the present invention will now be described with reference to FIG. 1. A wireless communications system 10 provides communications services such as interconnect, short message service (SMS), packet data and push-to-talk, to a plurality of subscriber units 20, 22 and 24 using one or more wireless technologies such as code division multiple access (CDMA), global system for mobile communication (GSM), time division multiple access (TDMA) or Advanced Mobile Phone Service (AMPS). The subscriber units 20, 22 and 24 are devices adapted to communicate with the wireless communications system 10 such as mobile telephones, personal digital assistants, and portable computers. The subscriber units 20, 22, and 24 may also include wireline devices coupled to the wireless communications network 10 through a physical connection, such as through the Internet.

In the exemplary embodiment, the wireless communications system 10 includes a 3G CDMA2000 1xEV-DO network providing High Performance PTT, and each subscriber unit 20, 22 and 24 is a HPPTT-enabled device. In one embodiment, the HPPTT services utilize a Voice-over-IP ("VoIP") PTT communications technology for 3G CDMA networks that enables near-instant, one-to-one and one-to-many half-duplex communication. A HPPTT call is formed by combining separate IP connections between each subscriber unit at a HPPTT Server, such as HPPTT servers 30, 32 and 34. Each HPPTT server 30, 32 and 34 manages HPPTT calls originating within its respective regional network 40, 42 and 44, and provides HPPTT application services to the subscriber units operating therein.

In operation, a HPPTT call may be originated by a subscriber unit 20 with the single press of a PTT button. HPPTT software on the subscriber unit 20 initiates a call request to the regional HPPTT server 30, which establishes IP communications with each target subscriber unit, such as subscriber units 22 and 24, through their respective regional HPPTT servers 32 and 34. The originating HPPTT subscriber unit 20 receives presence information from the HPPTT Server 30 concerning the availability of each target subscriber unit 22 and 24. If a target user is available, the call originator can begin speaking. Communications between participating subscriber units are facilitated using voice-over Internet protocol (VoIP) technologies in which voice information is converted to digital form and transmitted over IP-based data networks in data packets.

PTT calls may also be originated from an external network to a target HPPTT subscriber unit on the HPPTT network 10. In one embodiment, each HPPTT region includes an interoperability gateway, 50, 52 and 54, respectively (referred to herein as HPPTT Gateways), that facilitates PTT communications between the wireless communications system 10 and a PTT interoperability infrastructure (PII) 60. The PII 60 also communicates with at least one other PTT network 70 through a gateway 74. The PTT network 70 may be any communications system, including wireless and wireline networks, that facilitates push-to-talk communications between at least two devices.

In the exemplary embodiment, the PTT network 70 is an Integrated Dispatch Enhanced Network (iDEN) adapted to communicate with the PII 60 through an iDEN PTT Gateway. In alternate embodiments, other dispatch protocols and/or technologies may be supported including PTT over Cellular network (PoC). A person having ordinary skill in the art will appreciate that the illustrated embodiment is exemplary and that other combinations of networks and wireless and wireline devices may be inter-worked and other wireless technologies and components may be implemented.

The PII 60 is an inter-working architecture that provides a core infrastructure to which PTT service providers may connect to enable inter-carrier and cross-technology PTT sessions. The PII 60 is adapted to assist in translating and managing PTT sessions between a plurality of PTT networks, such as the iDEN network 70 and the HPPTT network 10. In the exemplary embodiment, signaling messages between the HPPTT network 10 and the iDEN network 70 are based on standard Session Internet Protocol (SIP) signaling and the PII 60, HPPTT Gateways 50, 52 and 54 and iDEN PTT Gateway 74 support UDP and TCP transport protocols. Media messages passing between the HPPTT network 10 and the iDEN network 70 are transported using the RTP standard over UDP. In an alternate embodiment, the PII 60 uses EVRC for media packets on PTT HPPTT-iDEN calls. The PII 60 is adapted to handle media transcoding between networks, though it is contemplated that media transcoding may be performed by the iDEN PTT Gateway 74 or other interoperability gateways.

In operation, a subscriber unit 72 initiates a PTT call on the PTT network 70 to a target subscriber unit 20 on the HPPTT network 10. The PTT network 70 recognizes that target subscriber unit 20 is not a subscriber of the PTT network 70, for example, by checking the domain of the target address. The PTT controller 76 is adapted to forward PTT call requests directed to external subscriber units to the PII 60 through the iDEN PTT Gateway 74. In one embodiment, the iDEN PTT Gateway 74 translates signaling and messaging to a protocol compatible with the PII 60, such as SIP. The PII 60 determines the home network associated with target subscriber address and forwards the request to a HPPTT Gateway, such as gateway 54, of the HPPTT network 10. The HPPTT network 10 processes the initial request, attempts to locate the target subscriber unit 20, and responds back to the PII 60 with the status of the target subscriber unit. The PII 60 manages the PTT session between subscriber units 20 and 72, performing any necessary translation between the formats and protocols of the HPPTT network 10 and iDEN network 70.

Figure 2:
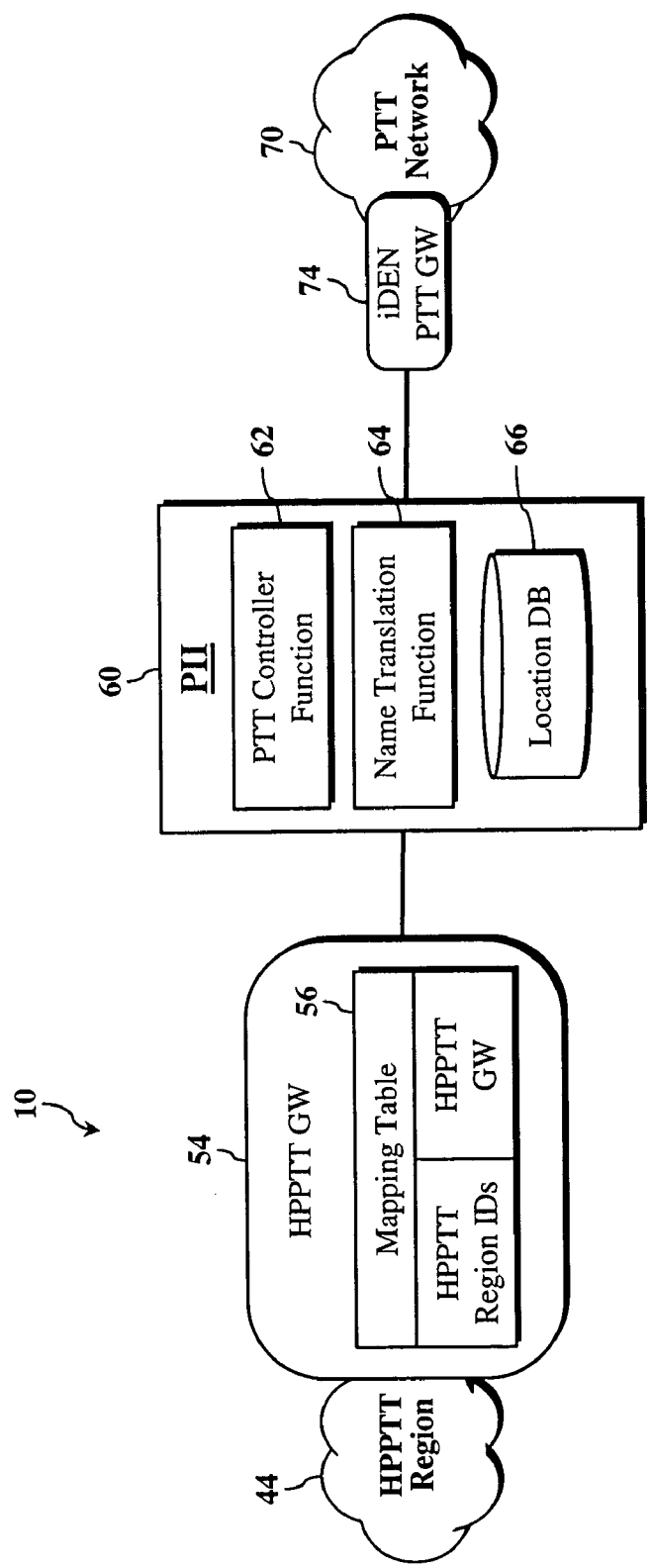
FIG. 2 illustrates a PTT Interoperability Infrastructure and a HPPTT Gateway in accordance with an embodiment of the present invention.

An embodiment of the PII 60 and the HPPTT Gateways will be described in greater detail with reference to FIG. 2. The PII 60 includes a PTT controller function 62 which is adapted to manage PTT sessions between the PTT network 70 and the HPPTT network 10, including the selection of one of the HPPTT Gateways to which to forward an incoming PTT call. A name translation function 64 provides address translation between the iDEN addressing scheme (e.g., UFMIs) and the HPPTT addressing scheme (e.g., SIP URI). In one embodiment, iDEN subscriber units are adapted to initiate PTT calls to a target UFMI, and HPPTT subscribers are assigned a UFMI (e.g., the HPPTT target's public telephone number) by the iDEN network for use with the PTT call.

In the exemplary embodiment, the PII 60 communicates with the HPPTT Gateways 50-54 and iDEN PTT Gateway 74 using SIP messaging. During PTT call setup, the PTT controller function 62 queries a location service database 66 which stores the last known location of subscriber units that have participated in inter-network calls through the PII 60. If the HPPTT target 20 is found in the location service database 66, the PTT controller function 62 forwards the PTT call request to the HPPTT Gateway associated with the HPPTT target 20's last known location. If the HPPTT target 20 is not found, then the PTT controller function 62 selects a HPPTT Gateway, in accordance with stored routing rules, to receive the PTT call request.

The HPPTT Gateway 54 is adapted to intelligently redirect calls to the HPPTT Gateway where the target subscriber is located. When the HPPTT region 44 responds to a call request with a location of a target subscriber unit that is outside the HPPTT region 44, the HPPTT Gateway 54 identifies the local HPPTT region in a mapping table 56 and transmits a redirect message (e.g., SIP 301/302 message) to the PII 60. The PTT Controller Function 62 is adapted to receive the redirect message from the HPPTT Gateway 54 and redirect the message to the identified HPPTT Gateway.

Figure 3:
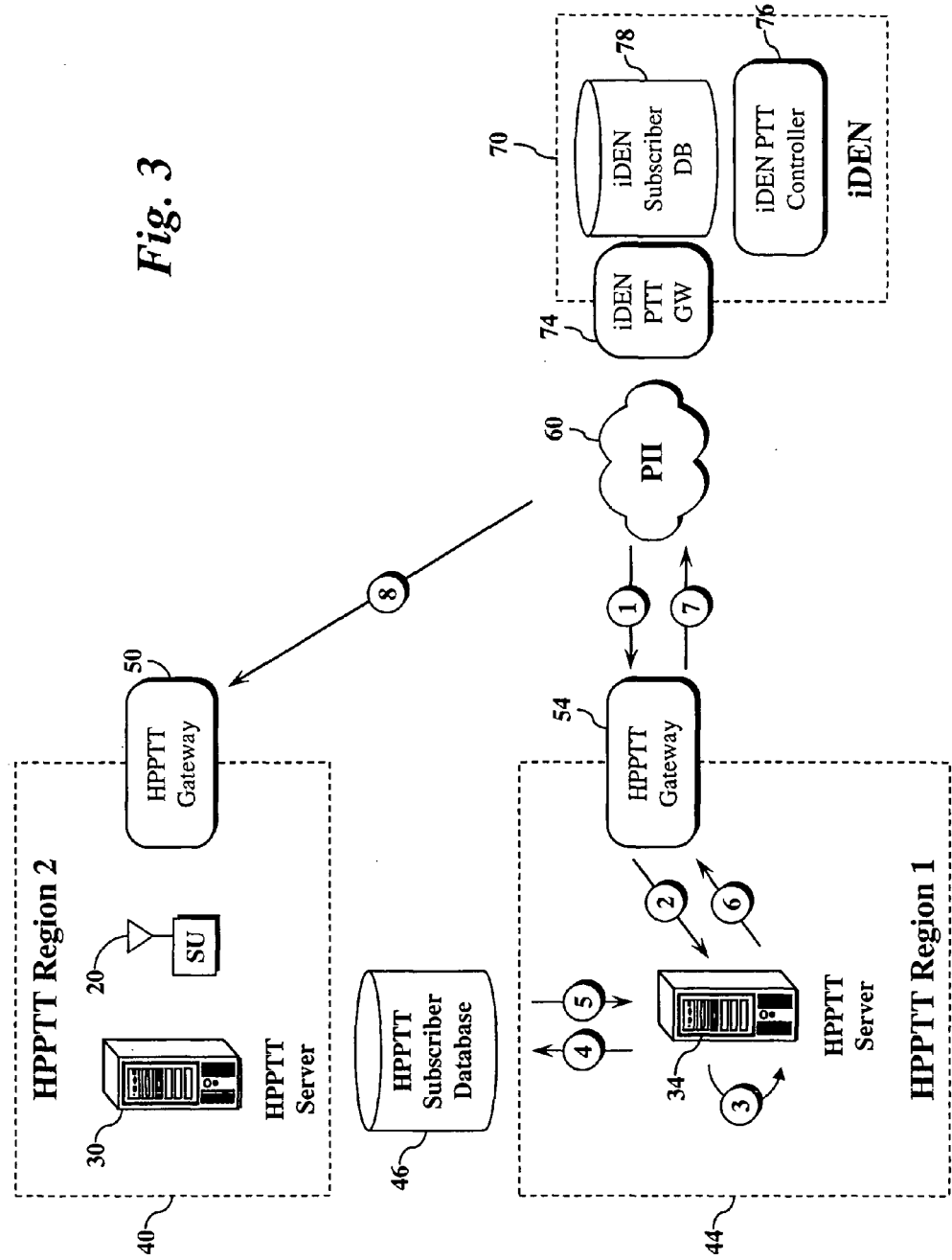
FIG. 3 illustrates an embodiment of an operation of the PTT network architecture of FIGS. 1 and 2.
Figure 4:
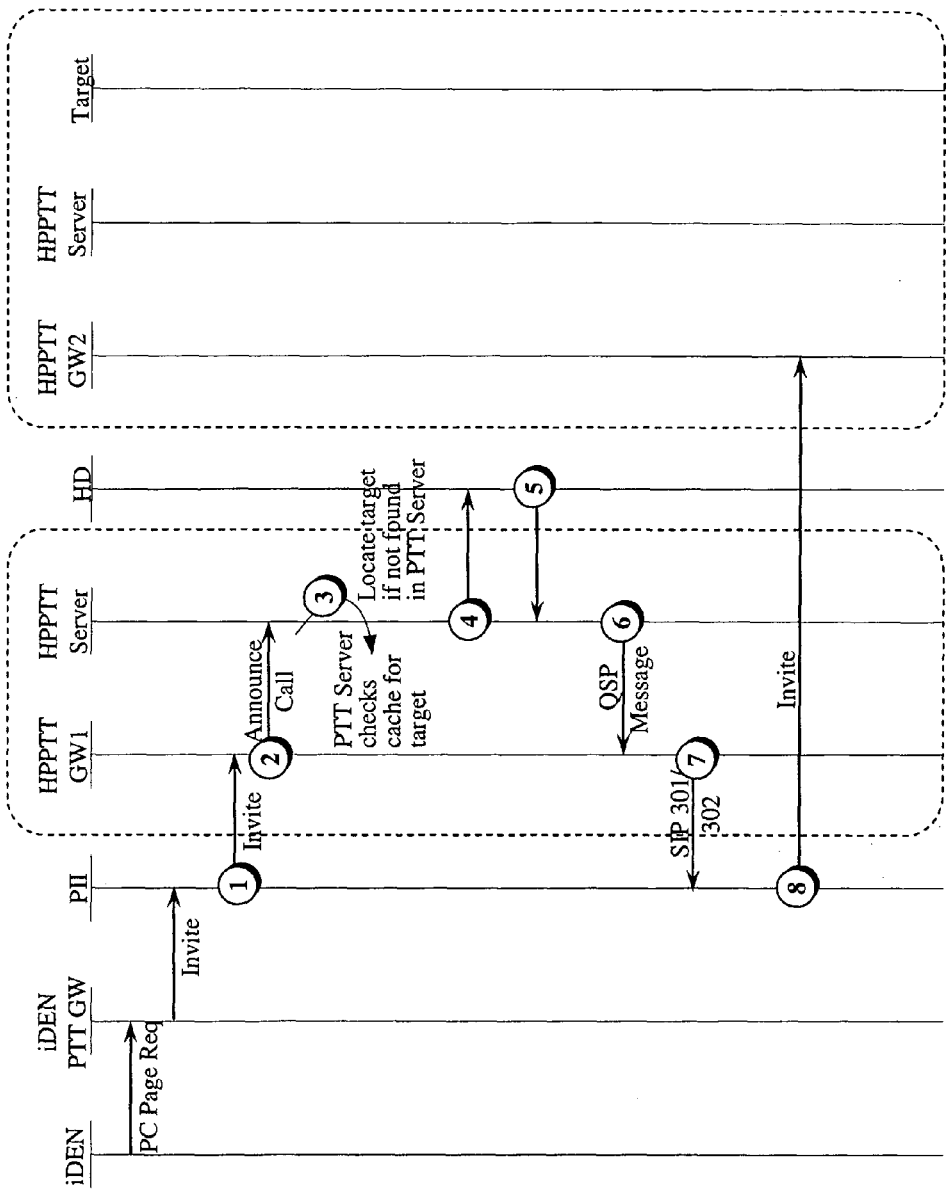
FIG. 4 is a call flow diagram illustrating an embodiment of an operation of the PTT network architecture of FIGS. 1 and 2.

An embodiment of an operation of the exemplary system will now be described with reference to FIGS. 3 and 4. A PTT call originated on the iDEN network is directed to at least one HPPTT target subscriber unit, including HPPTT subscriber unit 20. The iDEN PTT Controller 76 on the iDEN network 70 is the serving PTT processor for the call, and the iDEN Subscriber Database 78 is adapted to direct all HPPTT targeted calls to the iDEN PTT Gateway 74. The iDEN PTT Gateway 74 receives the page request from the iDEN network 70, prepares a corresponding SIP INVITE request and transmits the SIP INVITE request to the PII 60 for forwarding to the HPPTT target subscriber unit 20. In step 1, the PII 60 receives the SIP INVITE request and replies with a provisional response to the iDEN PTT Gateway 74. The PII 60 selects a HPPTT Gateway associated with the target HPPTT network and forwards the request to the selected gateway. In the exemplary embodiment, the PII 60 lacks current information regarding the location of the subscriber unit 20 in the HPPTT network and selects a HPPTT Gateway 54 based on stored routing rules. The SIP INVITE message is routed through the SIP network to the selected HPPTT Gateway 54.

In step 2, the HPPTT Gateway 54 transmits an HPPTT Page Request message to a regional HPPTT Server 34. In step 3, the HPPTT Server 34 queries a local cache for the location of the target subscriber unit 20. If the target subscriber unit 20 is not found in the cache, the HPPTT Server 34 queries the HPPTT Subscriber Database 46 in step 4 for the location of the target subscriber unit 20, and the HPPTT Subscriber Database 46 returns the target subscriber unit's location in step 5. In the exemplary embodiment, the target subscriber unit 20 is located in a second HPPTT Region 40 that includes the regional HPPTT Server 30 and the HPPTT Gateway 50. If the target subscriber unit 20 is local to the HPPTT Server 34, then an HPPTT Page Request message is transmitted to the target subscriber unit 20, and the PTT call is facilitated through the HPPTT Server 30.

In step 6, after receiving the location of the target subscriber unit 20, the HPPTT Server 34 transmits a message to the HPPTT Gateway 54 with the serving HPPTT Server ID of the target HPPTT subscriber. After receiving the HPPTT message with the serving HPPTT server ID, in step 7 the HPPTT Gateway 54 queries the HPPTT Gateway-to-HPPTT Regional ID mapping table (see mapping table 56 in FIG. 2) for the regional ID received in the message, and sends a SIP redirect message to the PII 60. The SIP redirect message includes the serving Regional HPPTT Gateway ID. The PII 60 returns a SIP acknowledgement message to the HPPTT Gateway 54, and stores the regional ID of the target subscriber unit 20 in the location database 66 (see FIGS. 1 & 2). In step 8, the PII 60 sends the SIP invite to the HPPTT Gateway serving the HPPTT target 20 to redirect the call to the local region.

When the PII 60 receives a subsequent call request directed to the target subscriber unit 20, the PII 60 queries the location database 66 for the target subscriber unit 20 and selects the HPPTT Gateway corresponding to the database entry—in this case HPPTT Gateway 50—if found. The PII 60 transmits a SIP INVITE message to the HPPTT Gateway 50 which is local to the target subscriber unit 20 and continues the PTT call setup procedure.

With the introduction of redirect functionality to HPPTT Gateway selection, a PTT call to a roamed HPPTT target will be facilitated through a regional HPPTT Gateway, selected either in accordance with stored routing rules or through a redirect procedure as described herein. Subsequent calls will be directed to the HPPTT Gateway serving the HPPTT region where the target was last located. If the target subscriber unit 20 has roamed to a different HPPTT region, the call will be redirected to the HPPTT Gateway serving the current target region as described herein and the current location is stored in the PTT 60 for routing subsequent calls.

In an alternate embodiment, steps 2 and 3 can be eliminated, by modifying the HPPTT Gateway to directly query the HPPTT Subscriber Database for the target HPPTT subscriber's location. In step 5, the HPPTT Subscriber Database can send it's response directly to the HPPTT Gateway, bypassing the HPPTT Server. In this embodiment, no modification to the conventional HPPTT server is required.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a communications system including a first push-to-talk (PTT) network, and a second PTT network having a plurality of interoperability gateways, a method for selecting an interoperability gateway for PTT calls terminated at the second PTT network comprising:
   receiving a first PTT call request from the first PTT network, the first PTT call request identifying a target subscriber unit on the second PTT network;
   forwarding the first PTT call request to a first interoperability gateway of the second PTT network's plurality of interoperability gateways;
   receiving a redirect message from the first interoperability gateway including an identification of the target subscriber and a second interoperability gateway of the second PTT network's plurality of interoperability gateways, wherein the second interoperability gateway corresponds to a location of the target subscriber unit;
   storing an identifier of the target subscriber and an identifier of the second interoperability gateway in a cache for subsequent use in routing calls to the target subscriber unit; and
   redirecting the first PTT call to the second interoperability gateway.

2. The method of claim 1 wherein the first PTT network is an integrated dispatch enhanced network (iDEN) and wherein the method further comprises the steps of:
   generating, at the iDEN network, the first PTT call request;
   transmitting the request to an iDEN PTT Gateway; and
   translating the first PTT call request into a standard protocol.

3. The method of claim 2 wherein the second PTT network is a high performance PTT (HPPTT) network, and wherein the step of forwarding comprises:
   selecting the first interoperability gateway; and
   transmitting the first PTT call request to the first interoperability gateway using the standard protocol.

4. The method of claim 3 wherein the second PTT network is a HPPTT network, and wherein the step of forwarding further comprises:
   translating, by the second interoperability gateway, the first PTT call request to a HPPTT protocol.

5. The method of claim 4 wherein the standard protocol is a session initiation protocol.

6. The method of claim 1 wherein the step of forwarding further comprises:

searching a cache of target subscriber to interoperability gateway mappings for the target subscriber; and if the target subscriber is found, forwarding the target subscriber to the corresponding interoperability gateway.

7. The method of claim 1 further comprising the steps of:

receiving a second PTT call request, the second PTT call request identifying the target subscriber unit on the second PTT network;

searching the cache for the target subscriber unit; and forwarding the second PTT call request to the corresponding interoperability gateway.

8. The method of claim 1 wherein the first PTT network is a Push-to-Talk over Cellular (PoC) network and wherein the method further comprises the steps of:

generating, at the PoC network, the first PTT call request;

transmitting the request to a PTT Gateway; and translating the PoC PTT call request into a standard protocol.

9. In a PTT communications system including a first push-to-talk (PTT) network and a second PTT network having a plurality of interoperability gateways, a PTT interoperability infrastructure comprising:

a PTT controller adapted to select one of the second PTT network's plurality of interoperability gateways in response to a first PTT call request from the first PTT network to a PTT target on the second PTT network, and forward the first PTT call request to the selected PTT interoperability gateway, wherein the PTT controller is further adapted to receive a redirect message from the selected PTT interoperability gateway, the redirect message including an identifier of a second PTT interoperability gateway of the second PTT network's plurality of interoperability gateways, wherein the second interoperability gateway corresponds to a location of the PTT target, store the identifier of the second PTT interoperability gateway for use in routing a second PTT call request to the PTT target, and redirect redirecting the first PTT call request to the second PTT interoperability gateway.

10. The PTT interoperability infrastructure of claim 9 further comprising:

a name translation function adapted to translate addresses received in the first PTT call request from the addressing scheme of the first PTT network to the addressing scheme of the second PTT network.

11. The PTT interoperability infrastructure of claim 9 further comprising:

a cache storing PTT target IDs from the second PTT network and an ID of a corresponding one of the second PTT network's plurality of inter operability gateways, wherein, if the PTT target is in the cache, the PTT controller routes the incoming first PTT call request to the corresponding interoperability gateway.

12. In a PTT communications system including a first PTT network which is an integrated dispatch enhanced network (iDEN) and a second PTT network which is a high performance PTT (HPPTT) network having a plurality of interoperability gateways, a system comprising:

an interface to the iDEN network;

an interface to the HPPTT network;

a controller adapted to:

receive a first PTT call request from the iDEN network, the first PTT call request identifying a target subscriber unit on the HPPTT network;

forward the first PTT call request to a first HPPTT interoperability gateway of the HPPTT network's plurality of interoperability gateways;

receive a redirect message from the first HPPTT interoperability gateway, including an identification of the target subscriber and a second interoperability gateway of the HPPTT network's plurality of interoperability gateways, wherein the second interoperability gateway corresponds to a location of the target subscriber unit;

store the identification of the target subscriber and the second interoperability gateway for use in routing a subsequent PTT call request to the target subscriber; and redirect the first PTT call to the second interoperability gateway.

13. The system of claim 12 wherein the controller is further adapted to:

generate, at the iDEN network, the first PTT call request;

transmit the request to an iDEN PTT Gateway; and translate the first PTT call request into a standard protocol.

14. The system of claim 13 wherein the controller is further adapted to:

select the first interoperability gateway; and transmit the first PTT call request to the first interoperability gateway, using the standard protocol.

15. The system of claim 12 further comprising:

data storage adapted to store an identifier of the target subscriber and an identifier of the second interoperability gateway.

16. The system of claim 15 wherein the controller is further adapted to search the data storage for the target subscriber and forward the first PTT call request to the corresponding interoperability gateway.

17. The system of claim 12 wherein the controller is further adapted to:

receive a second PTT call request, the second PTT call request identifying the target subscriber unit on the HPPTT network;

search a cache for the target subscriber unit; and forward the second PTT call request to a corresponding interoperability gateway based on the search of the cache.

* * * * *

UNITED STATES PATENT AND TRADEMARK OFFICE
CERTIFICATE OF CORRECTION

| | | |
|---|---|---|
| PATENT NO. | : 8,059,613 B1 | |
| APPLICATION NO. | : 11/494987 | |
| DATED | : November 15, 2011 | |
| INVENTOR(S) | : Steven Barrow et al. | |

It is certified that error appears in the above-identified patent and that said Letters Patent is hereby corrected as shown below:

Column 7, Line 39, should read: redirect [redirecting] the first PTT call request to the sec- Signed and Sealed this
Twentieth Day of March, 2012

David J. Kappos
*Director of the United States Patent and Trademark Office*